US012753331B2

(12) United States Patent
Shen

(10) Patent No.: US 12,753,331 B2
(45) Date of Patent: Oct. 6, 2026

(54) FAST-DRY PRE-APPLIED ADHESIVE COMPOSITION

(71) Applicant: Henkel AG & Co. KGaA, Duesseldorf (DE)

(72) Inventor: Chen Shen, Zhejiang (CN)

(73) Assignee: Henkel AG & Co. KGaA, Duesseldorf (DE)

( * ) Notice: Subject to any disclaimer, the term of this patent is extended or adjusted under 35 U.S.C. 154(b) by 620 days.

(21) Appl. No.: 18/224,287

(22) Filed: Jul. 20, 2023

(65) Prior Publication Data

US 2023/0357613 A1 Nov. 9, 2023

Related U.S. Application Data

(63) Continuation of application No. PCT/CN2021/072797, filed on Jan. 20, 2021.

(51) Int. Cl.

*C08F 2/46* (2006.01)
*C08F 2/50* (2006.01)
*C08G 61/04* (2006.01)
*C09J 151/08* (2006.01)

(52) U.S. Cl.

CPC .................................. *C09J 151/08* (2013.01)

(58) Field of Classification Search

CPC .......... C09J 151/08; C09J 163/00; C09J 4/06; C08F 283/10; C08F 290/067; C08F 222/1065; C08F 220/20
USPC ................. 522/31, 6, 189, 184, 71, 1; 520/1
See application file for complete search history.

(56) References Cited

U.S. PATENT DOCUMENTS

2003/0060588 A1* 3/2003 Jacobine .............. C08G 18/672 528/44

FOREIGN PATENT DOCUMENTS

| | | | | |
|---|---|---|---|---|
| CN | 103305132 A | | 9/2013 | |
| CN | 108753228 A | | 11/2018 | |
| WO | WO-2013067947 A1 | * | 5/2013 | ......... B32B 37/1284 |
| WO | 2020254436 A1 | | 12/2020 | |

OTHER PUBLICATIONS

PCT International Search Report issued in connection with International Patent Application No. PCT/CN2021/072797 Mailing date: Oct. 19, 2021.

* cited by examiner

*Primary Examiner* — Jessica Whiteley
(74) *Attorney, Agent, or Firm* — Steven C. Bauman

(57) ABSTRACT

This invention relates to a fast-dry pre-applied adhesive composition comprising at least one (meth)acrylate component; at least one accelerator; at least one organic peroxide; at least one non-aromatic epoxy resin; and at least one cationic photoinitiator. The weight ratio between the (meth) acrylate component and the non-aromatic epoxy resin is from 1:4 to 4:1. The pre-applied adhesive composition of the present invention is firstly coated onto a surface of a substrate and dried with the assistance of UV light. The dried pre-applied adhesive composition is later anaerobically cured after the coated substrate is assembled with the mating substrates and provides excellent thread locking strength and lap shear strength for bonding.

16 Claims, No Drawings

FAST-DRY PRE-APPLIED ADHESIVE COMPOSITION

TECHNICAL FIELD

This invention relates to a fast-dry pre-applied adhesive composition comprising at least one (meth)acrylate component; at least one accelerator; at least one organic peroxide; at least one non-aromatic epoxy resin; and at least one cationic photoinitiator. The weight ratio between the (meth) acrylate component and the non-aromatic epoxy resin is from 1:4 to 4:1. The pre-applied adhesive composition of the present invention is firstly coated onto a surface of a substrate and dried with the assistance of UV light. The dried pre-applied adhesive composition is later anaerobically cured after the coated substrate is assembled with the mating substrate and provides excellent thread locking strength and lap shear strength for bonding.

BACKGROUND OF THE INVENTION

Mechanical locking devices, such as split washers and flat washers, are used to solve the problem of loosening that happens in most threaded assemblies. Because the working environments of the mechanical locking devices can be different and even very harsh, the mechanical locking devices don't always maintain clamp load and assemblies that are locked with the devices often loosen under vibration, thermal expansion or improper torque.

Pre-applied adhesive was invented to further prevent the threaded assemblies from loosening. Traditional pre-applied adhesive contains two parts of components. One part comprises polymerizable monomers and the other part comprises polymerization initiators encapsulated in the micro-capsules. The two parts of components are mixed before using and coated onto the threads of a substrate, such as a bolt. After the pre-applied adhesive is dried, a dry film is formed on the threaded substrate. The dry film is further cured anaerobically after the dry film coated threaded substrate is assembled to the mating substrate.

However, there are limitations for the current existing pre-applied adhesives. If the pre-applied adhesive is water based, the dry time to form the dry film is long, and the threaded substrate is not readily to be used. If the pre-applied adhesive is solvent based, the dry time is short, but the solvent is not good for the environment.

Therefore, there is a need for developing a new pre-applied adhesive which has short dry time and decent bonding strength.

SUMMARY OF THE INVENTION

The present invention relates to a pre-applied adhesive composition, comprising:

a) at least one (meth)acrylate component;
b) at least one accelerator;
c) at least one organic peroxide;
d) at least one non-aromatic epoxy resin; and
e) at least one cationic photoinitiator;

wherein the weight ratio between the (meth)acrylate component and the non-aromatic epoxy resin is from 1:4 to 4:1.

The present invention also relates to a production method of the pre-applied adhesive composition.

The present invention also relates to a curing method of the pre-applied adhesive composition. With the assistance of UV light, the pre-applied adhesive composition can be dried fast to form a dry film.

The present invention also relates to a dry film formed by the pre-applied adhesive composition.

The present invention also relates to a cured product of the pre-applied adhesive composition. The cured product of the pre-applied adhesive composition provides excellent thread locking strength and lap shear strength for bonding.

The present invention also relates to an article bonded by or coated with the dry film or cured product of the pre-applied adhesive composition.

DETAILED DESCRIPTION OF THE INVENTION

In the following passages the present invention is described in more detail. Each aspect so described may be combined with any other aspect or aspects unless clearly indicated to the contrary. In particularly, any feature indicated as being preferred or advantageous may be combined with any other feature or features indicated as being preferred or advantageous.

In the context of the present invention, the terms used are to be construed in accordance with the following definitions, unless a context dictates otherwise.

As used herein, the singular forms "a", "an" and "the" include both singular and plural referents unless the context clearly dictates otherwise.

The terms "comprising", "comprises" and "comprised of" as used herein are synonymous with "including", "includes" or "containing", "contains", and are inclusive or open-ended and do not exclude additional, non-recited members, elements or process steps.

The recitation of numerical end points includes all numbers and fractions subsumed within the respective ranges, as well as the recited end points.

All references cited in the present specification are hereby incorporated by reference in their entirety.

Unless otherwise defined, all terms used in the disclosing the invention, including technical and scientific terms, have the meaning as commonly understood by one of the ordinary skill in the art to which this invention belongs to. By means of further guidance, term definitions are included to better appreciate the teaching of the present invention.

In the context of this disclosure, a number of terms shall be utilized.

The term "dry film" refers to a solid film which is not tacky to the touch based on the test according to ASTM C679. The dry film of the present invention is obtainable by curing the pre-applied adhesive composition with UV light.

The term "cured product of the pre-applied adhesive composition" refers to a cured product which is obtainable from the pre-applied adhesive composition after both UV curing and anaerobic curing.

The term "(meth)acrylate" refers to both or any one of "acrylate" and "methacrylate".

The term "monomer" refers to a polymer building block which has a defined molecular structure and which can be reacted to form a part of a polymer.

The term "polymer" and "resin" are used interchangeably to encompass resin, oligomer, and polymer which refers to a macromolecule consisting of at least two monomer units.

The term "hydrocarbon group" refers to an organic compound consisting of carbon and hydrogen.

Example of hydrocarbon group includes but is not limited to an alkyl group, such as methyl, ethyl, propyl, butyl, pentyl, hexyl, isopropyl, tertiary butyl, isobutyl and the groups alike; an alkenyl group, such as vinyl, allyl, butenyl, pentenyl, hexenyl and the groups alike; an aralkyl group, such as benzyl, phenethyl, 2-(2,4,6-trimethylphenyl)propyl and the groups alike; or an aryl group, such as phenyl, tolyl, xyxyl and the groups alike.

The term “epoxy resin” refers to an epoxy compound containing at least one epoxy group in the molecular structure.

The term “non-aromatic epoxy resin” refers to an epoxy resin without a conjugated aromatic ring in the molecular structure.

(Meth)acrylate Component

The pre-applied adhesive composition of the present invention comprises at least one (meth)acrylate component which contains at least one group having the following general formula:

(1)

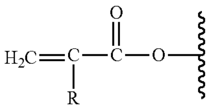

In formula (1), R represent hydrogen, halogen, or an optionally substituted $C_1$ to $C_{20}$ univalent hydrocarbon group. Preferably, R is hydrogen or an optionally substituted $C_1$ to $C_{10}$ univalent hydrocarbon group. The (meth)acrylate component may be used alone or in combination.

The (meth)acrylate component of the present invention may be present in the form of a monomer, a polymer, or a combination thereof. When in the form of a polymer, the (meth)acrylate component may be a chain to which is attached at least one group of formula (1). The (meth) acrylate component may have a chain constructed from polyvinyl, polyether, polyester, polyurethane, polyamide, vinyl ester, phenolic, amino resin, and the like. The groups of formula (1) may be located at a pendant or a terminal position of the backbone, or a combination thereof. Preferably, the (meth)acrylate component has at least two groups of formula (1) located at the terminal positions.

Illustrative (meth)acrylate monomers include isobornyl acrylate (IBOA), isobornyl methacrylate (IBOMA), tetrahydrofurfuryl acrylate (THFA), (5-ethyl-1,3-dioxan-5-YI) methyl acrylate, cyclohexyl acrylate, cyclohexyl methacrylate, t-butyl acrylate, t-butyl methacrylate, t-butylcyclohexyl acrylate, methyl methacrylate, ethyl methacrylate, propyl methacrylate, phenyl acrylate, phenyl methacrylate, benzyl acrylate, benzyl methacrylate, phenethyl acrylate, phenethyl methacrylate, dicyclopentanyl acrylate, 3,3,5-trimethylcyclohexyl acrylate, 3,3,5-trimethylcyclohexyl methacrylate, dicyclopentenyl acrylate, 1,6-hexanediol diacrylate, 2-ethylhexyl acrylate, n-octyl acrylate, n-nonyl acrylate, n-decyl acrylate, isooctyl acrylate, n-lauryl acrylate, n-tridecyl acrylate, n-cetyl acrylate, nstearyl acrylate, isomyristyl acrylate, and isostearyl acrylate (ISTA). The (meth)acrylate monomer can be used alone or in any combination.

Illustrative (meth)acrylate polymer includes a polyurethane (meth)acrylate polymer, a polyisoprene (meth)acrylate polymer, a polybutadiene (meth)acrylate polymer, a polyester (meth)acrylate polymer and a polyether (meth)acrylate polymer. The (meth)acrylate polymer can be used alone or in combination.

Examples of commercially available (meth)acrylate component are, for example, SR531, SR508 and SR285 from Sartomer; BR-3641AJ, BR3741AJ, BR-3641AA, BR-345, BR-543, BR-571 MB, BR-742M, BRC-443, BRC-443D, BRC-843, BRC-843S, BRC-843D, BR7432 GB, BR-641D, BR-641S, BR-744BT, and BR-744SD from Dymax Polymers & Coatings; EBECRYL230, EBECRYL-231, EBECRYL-242, EBECRYL-244, EBECRYL-246, EBECRYL-4491, EBECRYL4483, EBECRYL-8841, EBECRYL-8804, and EBECRYL-6603 from Allnex Group Companies; Visiomer HEMA 97 from Evonik.

In some embodiments of the present invention, the amount of the (meth)acrylate component is preferably from 5 to 90%, more preferably from 20 to 80%, and even more preferably 40 to 70% by weight based on the total weight of the pre-applied adhesive composition.

Accelerator

The pre-applied adhesive composition of the present invention comprises at least one accelerator to speed up the polymerization of (meth)acrylate component under anaerobic conditions. Suitable accelerator includes but is not limited to sulfimide (such as saccharin and the derivatives), tertiary amine (such as N,N-diethyl-p-toluidine, N,N-dimethyl-o-toluidiene, N,N dimethylaniline, N,N diethylaniline, p-isopropyl-N, N-dimethylaniline, N, N-dimethyl-p-toluidine, 2,4-dimethyl-N, N-dimethylaniline, 3,5-dimethyl-N, N-dimethylaniline), and hydrazine or hydrazide derivatives (such as sulfonic acid hydrazide, acetyl-2-phenylhydrazine (APH) and p-toluene sulphonylhydrazine). The accelerators can be used alone or in any combination.

In some embodiments of the present invention, the pre-applied adhesive composition preferably includes at least one sulfimide as accelerator, and more preferably includes both saccharin and acetyl-2-phenylhydrazine as accelerators.

Examples of commercially available accelerators are, for example, saccharin from Dow Chemical; Acetyl-2-phenylhydrazine from Sigma Aldrich; and N, N-diethyl-p-toluidine from Sigma Aldrich.

In some embodiments of the present invention, the amount of the accelerator is preferably from 0.1 to 5%, more preferably from 0.1 to 2%, and even more preferably from 0.1 to 0.5% by weight based on the total weight of the pre-applied adhesive composition.

Organic Peroxide

The pre-applied adhesive composition of the present invention comprises at least one organic peroxide which is not sensitive to UV light as initiator to induce the polymerization of (meth)acrylate component under anaerobic conditions. Suitable organic peroxide includes but is not limited to dicumyl peroxide (DCP), benzoyl peroxide (BPO), di(tert butyl) peroxide and 2,5-dimethyl-2,5-bis(t-butylperoxy)-hexyne (DBPH), bis(2,4-dichlorobenzoyl)peroxide (DCBP), 1,1-bis(tert-butylperoxy)-3,3,5-trimethylcyclohexane, and organic hydroperoxide (such as cumene hydroperoxide (CHP), tert butyl hydroperoxide (TBH), methylethyl ketone hydroperoxide, and diisopropyl-benzene-hydroperoxide). The organic peroxide can be used alone or in combination. In some embodiments of the present invention, organic hydroperoxide is more preferred.

Examples of commercially available organic peroxides, for example, are DCP from Taicang Plastic Additive Co., Ltd.; DCP-40 from Jiangsu Daoming Chemical Co., Ltd; Varox 231 XL from Vanderbilt Chemicals, LLC; TMCH-40 from United Initiators Inc; Luperox CU90 and KC70 from Arkema.

In some embodiments of the present invention, the amount of the organic peroxide is from 0.1 to 3%, and preferably from 0.1 to 0.5% by weight based on the total weight of the pre-applied adhesive composition.

Non-Aromatic Epoxy Resin

The pre-applied adhesive composition of the present invention comprises at least one non-aromatic epoxy resin. Suitable non-aromatic epoxy resin includes but is not limited to aliphatic epoxy resin (such as propylene glycol-diglycidyl ether and pentaerythritol-polyglycidyl ether), alicyclic epoxy resin (such as 3.4-epoxycyclohexylmethyl-3.4-epoxycyclohexanecarboxylate and bis (3.4-epoxycyclohexylmethyl) adipate), and heterocyclic epoxy resin (such as triglycidyl isocyanurate). The non-aromatic epoxy resin can be used alone or in combination.

Examples of commercially available non-aromatic epoxy resins, for example, are Araldite CY179, 184, 192, from Ciba Specialty Chemicals; EHPE-3150 from Daicel Chemical Industries, Ltd; and Syna-Epoxy S21, 27, 28 from Nantong Synasia New Material Co., Ltd.

In some embodiments of the present invention, the amount of the non-aromatic epoxy resin is from 20 to 70%, and preferably from 30 to 50% by weight based on the total weight of the pre-applied adhesive composition.

It is surprisingly found that when the weight ratio between the (meth)acrylate component and the non-aromatic epoxy resin is from 1:4 to 4:1, a proper dry film can be formed very fast on the substrate from the pre-applied adhesive composition after UV curing and has sufficient elasticity. If the weight ratio is not in the range, the film is either too hard or too wet to be used for later assembling of the film coated substrate with the mating substrate. When the film is too hard, the film does not have enough elasticity resulting in that the film coated substrate cannot be assembled to the mating substrate especially in the case that if the film coated substrate is a screw bolt and the mating substate is a screw nut. When the film is too wet, the film tends to sag or flow over time making the adhesive composition not suitable to be used as a pre-applied adhesive.

In some embodiments of the present invention, the weight ratio between the (meth)acrylate component and the non-aromatic epoxy resin is more preferably from 1:2 to 3:1. In further embodiments of the present invention, the weight ratio between the (meth)acrylate component and the non-aromatic epoxy resin is even more preferably from 2:1 to 3:1 so that the cured product of the pre-applied adhesive composition has better thread locking strength and lap shear strength.

It is also found that if epoxy resin containing conjugated aromatic ring in the molecular structure is used, the film formed on the substrate after UV curing is too hard to be used for later assembling of the film coated substrate with the mating substrate.

Cationic Photoinitiator

The pre-applied adhesive composition of the present invention comprises at least one cationic photoinitiator to initiator the polymerization of non-aromatic epoxy resin. The cationic photoinitiator, when irradiated, forms an excited state which then breaks down to release a radical cation. This radical cation reacts with hydrogen atom donors, and generates a protonic acid, which initiates the crosslinking reaction.

The most commonly used cationic photoinitiators are organic halonium, iodonium or sulfonium salts. In some embodiments of the present invention, organic Iodonium or sulfonium salts are preferable to be incorporated in the pre-applied adhesive composition. The anions in theses salts generally possess low nucleophilic character and include but are not limited to $SbF_6$, $PF_6$, $AsF_6$, $BF_4$, $B(C_6F_5)_4$ or $Ga(C_6F_5)_4$. The iodonium salt may be selected from, for example, diaryliodonium hexafluorophosphate, diaryliodonium hexafluoroantimonate, diaryliodonium tetrakis(pentafluorophenyl)borate, 4-octyloxyphenyl phenyliodonium hexafluoroantimonate, 4-(2-hydroxytetradecyloxyphenyl) phenyliodonium hexafluoroantimonate, and 4-(1-methylethyl)phenyl 4-methylphenyliodonium tetrakis(pentafluorophenyl)borate. The sulfonium salt may be selected from, for example, 4-thiophenyl phenyl diphenyl sulfonium hexafluoroantimonate, triarylsulfonium hexafluorophosphate and triarylsulfonium hexafluoroantimonate. The cationic photoinitiators can be used alone or in combination.

Examples of commercially available cationic photoinitiators, for example, are Irgacure 290 from BASF; UVI-6976, 6992 from Nantong Synasia New Material Co., Ltd; and Cyracure UVI 9676 from Dow Chemicals.

In some embodiments of the present invention, the amount of the cationic photoinitiator is from 0.2 to 4%, and preferably from 0.5 to 1.5% by weight based on the total weight of the pre-applied adhesive composition.

Optional Additives

The pre-applied adhesive composition may further comprise optional additives. The selection of suitable additives for the pre-applied adhesive composition of the invention depends on the specific intended use of the pre-applied adhesive composition and can be determined in the individual case by those skilled in the art.

Stabilizer

The pre-applied adhesive composition of the present invention may optionally comprise at least one stabilizer to control and prevent premature peroxide decomposition and polymerization of the composition of the present invention. Suitable stabilizer includes but is not limited to phenols (such as hydroquinones and tetrahydroquinones), quinones (such as napthaquinone and anthraquinone), and chelating agents (such as the tetrasodium salt of ethylenediamine tetraacetic acid ("EDTA") and beta keto esters). The stabilizer can be used alone or in combination.

In some embodiments of the present invention, the amount of the stabilizer is from 0 to 2%, and preferably from 0.1 to 1% by weight based on the total weight of the pre-applied adhesive composition.

Fumed Silica

The pre-applied adhesive composition of the present invention may optionally comprise at least one fumed silica to adjust the thixotropy and thickening of the composition.

Examples of commercially available fumed silica are, for example, CAB-O-SIL M-5 from Cabot Corporation and AEROSIL R 974 from Evonik Specialty Chemicals (Shanghai) Co, Ltd.

In some embodiments of the present invention, the amount of the fumed silica is preferably from 0 to 5%, and more preferably from 0.1 to 3% by weight based on the total weight of the pre-applied adhesive composition.

Other optional additives that may be used in the pre-applied adhesive composition of the present invention, include but are not limited to biocides, dyes, pigments, and the mixtures thereof.

In a preferred embodiment, the pre-applied adhesive composition comprises:

(a) from 5 to 90% by weight of at least one (meth)acrylate component;

(b) from 0.1 to 0.5% by weight of at least one accelerator;

(c) from 0.1 to 0.5% by weight of at least one organic peroxide;

(d) from 20 to 70% by weight of at least one non-aromatic epoxy resin; and (e) from 0.5 to 1.5% by weight of at least one cationic photoinitiator;

wherein the weight percentages of all components add up to 100% by weight; and the weight ratio between the (meth)acrylate component and the non-aromatic epoxy resin is from 1:4 to 4:1.

A person skilled in the art will be able to make appropriate choices among the varies components based on the description, representative examples and guidelines of the present invention to prepare a composition to achieve desired effects.

The pre-applied adhesive composition of the present invention may be prepared by homogeneously mixing all components together, and preferably by steps of:

a) mixing all components together except for organic peroxide and cationic photoinitiator;

b) adding at least one organic peroxide and at least one cationic photoinitiator to the mixture from step a); and c) further mixing all components uniformly to obtain the pre-applied adhesive composition.

The temperature is preferably to be controlled to be below 50° C. during the whole adhesive preparation process.

A variety of substrates are suitable to be coated with the pre-applied adhesive composition of the present invention. For instance, appropriate substrates may be constructed from steel, brass, copper, aluminum, zinc, and other metals and alloys. The pre-applied adhesive composition may be applied to the substrate via a brush, a scarper, a sprayer, a dispenser or an extruder, and allowed to be firstly cured with UV light which creates a dry film on the surface of the substrate. The dry film coated substrate could be assembled to the mating substrate right away after the dry film is formed, and the pre-applied adhesive composition can be further cured anaerobically. Optionally, if the mating substrate is not ready, the dry film coated substrate could be stored in room environment (23° C. and 50% RH) for at least 7 days and assembled to the mating substrate after it is ready.

In some embodiments, the pre-applied adhesive composition is preferably applied to a substrate and cured by steps of:

a) providing a substrate;

b) applying the pre-applied adhesive composition to a surface of the substrate to generate an adhesive layer;

c) illuminating the adhesive layer with UV light to obtain a dry film;

d) assembling the dry film coated substrate with a mating substrate and creating an anaerobic environment; and e) curing the dry film anaerobically.

The dry film formed by the pre-applied adhesive composition of the present invention has a tacky free surface and has sufficient elasticity for the later assembling process. Preferably, the dry film has a hardness ranging from 15 to 40 Shore D measured according to ISO 868.

The cured product of the pre-applied adhesive composition which is obtained after the pre-applied adhesive composition is cured by both UV curing and anaerobic curing exhibits excellent thread locking strength and lap shear strength. Preferably, the cured product has a break torque ranging from 11 to 22 N*m measured according to ISO 10964, and a lap shear strength ranging from 6 to 11 $N/mm^2$ measured according to ISO 4587.

EXAMPLES

The present invention will be further described and illustrated in detail with reference to the following examples. The examples are intended to assist one skilled in the art to better understand and practice the present invention, however, are not intended to restrict the scope of the present invention. All numbers in the examples are based on weight unless otherwise stated.

Example 1-16

The following materials were used in the examples.

Bomar BR-543 (Difunctional aliphatic polyether urethane acrylate available from Dymax);

Bomar BR-571 MB (Difunctional aliphatic polyether urethane methacrylate available from Dymax);

Bomar BR-742M (Difunctional aliphatic polyester urethane methacrylate available from Dymax);

Visiomer HEMA 97 (Methacrylic acid 2-hydroxyethyl ester available from Evonik);

Saccharin (Saccharin available from Dow Chemical);

APH (Acetyl-2-phenylhydrazine available from Sigma Aldrich);

CHP (Cumene hydroperoxide available from SCRC);

Syna-Epoxy S21 (3,4-Epoxycyclohexylmethyl 3,4-epoxycyclohexanecarboxylate available from Nantong Synasia New Material Co., Ltd.) having the structure of:

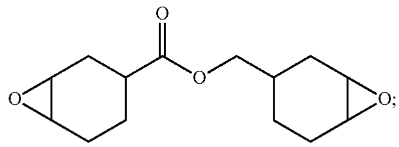 [SMILES: O=C(OCC1CCC2OC2C1)C1CCC2OC2C1]

;

Syna-Epoxy S28 (Bis (3,4-epoxycyclohexylmethyl) adipate available from Nantong Synasia New Material Co., Ltd.) having the structure of:

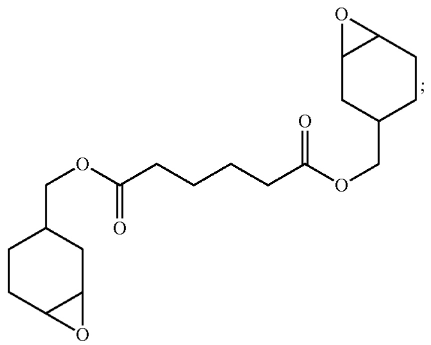 [SMILES: O=C(CCCCC(=O)OCC1CCC2OC2C1)OCC1CCC2OC2C1]

;

UVI 6976 (4-Thiophenyl phenyl diphenyl sulfonium hexafluoroantimonate available from Nantong Synasia New Material Co., Ltd.) having the structure of:

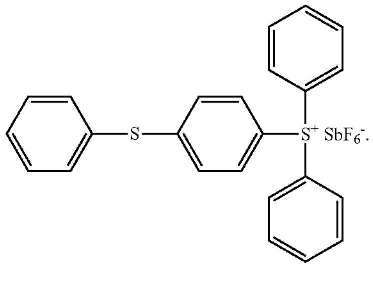

.

The pre-applied adhesive composition samples were prepared as Examples (Ex.) using the components and respect weight percentages according to Table 1a and 1 b by steps of:

a) mixing Bomar BR-543/BR-571 MB/BR-742M, Visiomer HEMA 97, Saccharin, APH, and Syna-Epoxy S21/S28 together at a speed of 600 rpm for 30 minutes.
b) adding CHP and UVI 6976 to the mixture from step a); and
c) further mixing all components at a speed of 600 rpm for 2 hours to obtain the pre-applied adhesive composition samples.

The temperature was controlled to be about 25° C. during the whole adhesive preparation process.

The pre-applied adhesive composition samples were subjected to various tests, and the results are reported in Table 2 to 4.

TABLE 1a

| Pre-applied adhesive composition | | | | | | | | |
|---|---|---|---|---|---|---|---|---|
| | Weight (%) | | | | | | | |
| Component | Ex. 1 | Ex. 2 | Ex. 3 | Ex. 4 | Ex. 5 | Ex. 6 | Ex. 7 | Ex. 8 |
| Bomar BR-543 | 16.4 | 24.7 | 32.77 | 37.09 | 16.4 | 24.7 | 32.77 | 37.09 |
| Bomar BR-571MB | 0 | 0 | 0 | 0 | 0 | 0 | 0 | 0 |
| Bomar BR-742M | 0 | 0 | 0 | 0 | 0 | 0 | 0 | 0 |
| Visiomer HEMA 97 | 16.4 | 24.7 | 32.77 | 37.09 | 16.4 | 24.7 | 32.77 | 37.09 |
| Saccharin | 0.17 | 0.25 | 0.33 | 0.38 | 0.17 | 0.25 | 0.33 | 0.38 |
| APH | 0.07 | 0.1 | 0.13 | 0.15 | 0.07 | 0.1 | 0.13 | 0.15 |
| CHP | 0.17 | 0.25 | 0.33 | 0.38 | 0.17 | 0.25 | 0.33 | 0.38 |
| Syna-Epoxy S21 | 0 | 0 | 0 | 0 | 65.49 | 49 | 33 | 24.41 |
| Syna-Epoxy S28 | 65.49 | 49 | 33 | 24.41 | 0 | 0 | 0 | 0 |
| UVI 6976 | 1.3 | 1 | 0.67 | 0.5 | 1.3 | 1 | 0.67 | 0.5 |

TABLE 1b

| Pre-applied adhesive composition | | | | | | | | |
|---|---|---|---|---|---|---|---|---|
| | Weight (%) | | | | | | | |
| Component | Ex. 9 | Ex. 10 | Ex. 11 | Ex. 12 | Ex. 13 | Ex. 14 | Ex. 15 | Ex. 16 |
| Bomar BR-543 | 0 | 0 | 0 | 0 | 0 | 0 | 8.3 | 41.5 |
| Bomar BR-571MB | 16.4 | 24.7 | 37.09 | 0 | 0 | 0 | 0 | 0 |
| Bomar BR-742M | 0 | 0 | 0 | 16.4 | 32.77 | 37.09 | 0 | 0 |
| Visiomer HEMA 97 | 16.4 | 24.7 | 37.09 | 16.4 | 32.77 | 37.09 | 8.3 | 41.5 |
| Saccharin | 0.17 | 0.25 | 0.38 | 0.17 | 0.33 | 0.38 | 0.08 | 0.42 |
| APH | 0.07 | 0.1 | 0.15 | 0.07 | 0.13 | 0.15 | 0.04 | 0.16 |
| CHP | 0.17 | 0.25 | 0.38 | 0.17 | 0.33 | 0.38 | 0.08 | 0.42 |
| Syna-Epoxy S21 | 0 | 49 | 0 | 0 | 33 | 24.41 | 0 | 0 |
| Syna-Epoxy S28 | 65.49 | 0 | 24.41 | 65.49 | 0 | 0 | 81.6 | 15.7 |
| UVI 6976 | 1.3 | 1 | 0.5 | 1.3 | 0.67 | 0.5 | 1.6 | 0.3 |

Test Methods

The pre-applied adhesive composition samples were applied to the surfaces of RS-14 mild steel substrates (available from Baiside) by brushing. The thickness of the sample adhesive layers was controlled to be about 0.5 mm.

The sample adhesive layers were shined with UV light of 365 nm at an intensity of 100 mW/$cm^2$ using Loctite ZETA 7401 UV flood chamber for 30 seconds to form films on the surfaces of the RS-14 mild steel substrates. The film coated RS-14 mild steel substrates were left in room environment (23° C. and 50% RH) for 1 hour after the pre-described UV curing and then used for the following hardness test, surface dryness test and lap shear strength test.

Hardness Test

The hardness of the film was measured according to ISO 868 using a shore D durometer (BS 61 II available from Bareiss).

Surface Dryness Test

The surface of the film was checked according to ASTM C679. A propylene plate was used to test the dryness of the film. If the film could not be lifted together with the propylene plate, the film was considered to be a dry film and tacky-free surface property of the film was ranked as "Pass". On the contrary, if the film could be lifted together with the propylene plate, the film was not considered to be a dry film and the tacky-free surface property of the film was ranked as "Fail".

Lap Shear Strength

The film coated RS-14 mild steel substrate was assembled with a mating substrate (RS-14 mild steel substrate available from Baiside) to generate an anaerobic environment which allowed the film to be further cured to obtain the cured product of the pre-applied adhesive composition. The film was cured for 24 hours anaerobically before subjected to lap shear strength test.

The lap shear strength of the cured product was measured according to ISO 4587 using a universal from MTS (model 43) with a 2 mm/min engaging speed.

Thread Locking Strength

The pre-applied adhesive composition samples were applied to screw threads of the screw bolts (M10 Black Oxide bolts available from Baiside) by dipping the screw bolts into the adhesive samples. The pre-applied adhesive composition samples were shined with UV light of 365 nm at an intensity of 100 mW/$cm^2$ using Loctite ZETA 7401 UV flood chamber for 30 seconds to form films on the screw threads of the screw bolts.

The film coated screw bolts were left in room environment (23° C. and 50% RH) for 1 hour after the pre-described UV curing, and assembled with screw nuts (mild steel nut available from Baiside). The assembled screw bolts and nuts were left in room environment (23° C. and 50% RH) for 24 hours to allow the film to be further cured anaerobically to obtain the cured product of the pre-applied adhesive composition.

The bonding strength of break torque and prevail torque of the cured product was measured according to ISO 10964. A torque testing machine from Hengyi Testing Instrument Co. Ltd (HY-NZ) was used for the tests, and the rotation rate in the break torque and prevail torque test was selected to be 60 rpm.

Test Results

TABLE 2a

| Film Hardness | | | | | | | | |
|---|---|---|---|---|---|---|---|---|
| | Ex. 1 | Ex. 2 | Ex. 3 | Ex. 4 | Ex. 5 | Ex. 6 | Ex. 7 | Ex. 8 |
| Hardness (shore D) | 33 | 28 | 24 | 21 | 30 | 24 | 18 | 16 |

TABLE 2b

| Film Hardness | | | | | | | | |
|---|---|---|---|---|---|---|---|---|
| | Ex. 9 | Ex. 10 | Ex. 11 | Ex. 12 | Ex. 13 | Ex. 14 | Ex. 15 | Ex. 16 |
| Hardness (shore D) | 32 | 27 | 22 | 35 | 22 | 20 | 65 | 8 |

The hardness of the films formed by the pre-applied adhesive composition samples is reported in Table 2a and 2b. The hardness of the films in Ex. 1 to 14 was acceptable. The hardness of the film in Ex. 15 was too high and the hardness of the film in Ex. 16 was too low.

TABLE 3a

| Surface Dryness of Film | | | | | | | | |
|---|---|---|---|---|---|---|---|---|
| | Ex. 1 | Ex. 2 | Ex. 3 | Ex. 4 | Ex. 5 | Ex. 6 | Ex. 7 | Ex. 8 |
| Tacky-free Surface property | Pass | Pass | Pass | Pass | Pass | Pass | Pass | Pass |

TABLE 3b

| Surface Dryness of Film | | | | | | | | |
|---|---|---|---|---|---|---|---|---|
| | Ex. 9 | Ex. 10 | Ex. 11 | Ex. 12 | Ex. 13 | Ex. 14 | Ex. 15 | Ex. 16 |
| Tacky-free Surface property | Pass | Pass | Pass | Pass | Pass | Pass | Pass | Fail |

The surface dryness of films formed by the pre-applied adhesive composition samples is reported in Table 3a and 3b. The films formed in Ex. 1 to 15 were acceptable dry films. The film formed in Ex. 16 was not dry and had a tacky surface which could sag or flow over time making the adhesive composition not suitable to be used as a pre-applied adhesive.

TABLE 4a

| Lap Shear Strength of Cured Pre-applied Adhesive Composition | | | | | | | | |
|---|---|---|---|---|---|---|---|---|
| | Ex. 1 | Ex. 2 | Ex. 3 | Ex. 4 | Ex. 5 | Ex. 6 | Ex. 7 | Ex. 8 |
| Lap shear strength ($N/mm^2$) | 7.8 | 8.4 | 9.6 | 10.1 | 6.7 | 7.4 | 8.5 | 9.2 |

TABLE 4b

| Lap Shear Strength of Cured Pre-applied Adhesive Composition | | | | | | | | |
|---|---|---|---|---|---|---|---|---|
| | Ex. 9 | Ex. 10 | Ex. 11 | Ex. 12 | Ex. 13 | Ex. 14 | Ex. 15 | Ex. 16 |
| Lap shear strength ($N/mm^2$) | 8.5 | 7.8 | 10.5 | 9.1 | 8.6 | 8.9 | Less than 0.5 | 9.3 |

The lap shear strength of the cured products of the pre-applied adhesive composition samples is reported in Table 4a and 4b. The lap shear strength of the cured product of the pre-applied adhesive composition sample in Ex. 15 was too small compared with the other examples.

TABLE 5a

| Thread Locking Strength of Cured Pre-applied Adhesive Composition | | | | | | | | |
|---|---|---|---|---|---|---|---|---|
| | Ex. 1 | Ex. 2 | Ex. 3 | Ex. 4 | Ex. 5 | Ex. 6 | Ex. 7 | Ex. 8 |
| Break Torque (N*m) | 13.3 | 13.6 | 18.8 | 21.2 | 11.7 | 12.4 | 14.1 | 15.9 |
| Prevail Torque (N*m) | 5.5 | 6.2 | 9.3 | 10.6 | 4.9 | 5.3 | 6.5 | 7.3 |

TABLE 5b

| Thread Locking Strength of Cured Pre-applied Adhesive Composition | | | | | | | | |
|---|---|---|---|---|---|---|---|---|
| | Ex. 9 | Ex. 10 | Ex. 11 | Ex. 12 | Ex. 13 | Ex. 14 | Ex. 15 | Ex. 16 |
| Break Torque (N*m) | 14.7 | 14.5 | 19.3 | 12.5 | 12.5 | 13.4 | N/A | 14.8 |
| Prevail Torque (N*m) | 6.3 | 6.6 | 10.5 | 4.5 | 5.6 | 6.8 | N/A | 7.7 |

The thread locking strength of the cured products of the pre-applied adhesive composition samples is reported in Table 5a and 5b. The thread locking strength of the cured product of the pre-applied adhesive composition sample in Ex. 15 was not able to be measured because the film coated on the screw bolt was too hard making the screw bolt not possible to be assembled with the screw nut.

What is claimed is:

1. A pre-applied adhesive composition comprising:

a) at least one (meth)acrylate component;

b) at least one accelerator;

c) at least one organic peroxide;

d) at least one non-aromatic epoxy resin; and e) at least one cationic photoinitiator;

wherein the weight ratio between the (meth)acrylate component and the non-aromatic epoxy resin is from 1:4 to 4:1; and wherein the pre-applied composition has a shore D hardness of from 15 to 40, subsequent to cure.

2. The pre-applied adhesive composition according to claim 1, wherein the (meth)acrylate component is selected from (meth)acrylate monomer, (meth)acrylate polymer, or the combination thereof.

3. The pre-applied adhesive composition according to claim 1, wherein the accelerator is selected from sulfimide, tertiary amine, hydrazine, hydrazide or any combination thereof.

4. The pre-applied adhesive composition according to claim 3, wherein the accelerator includes both saccharin and acetyl-2-phenylhydrazine.

5. The pre-applied adhesive composition according to claim 1, wherein the non-aromatic epoxy resin is selected from aliphatic epoxy resin, alicyclic epoxy resin, heterocyclic epoxy resin or any combination thereof.

6. The pre-applied adhesive composition according to claim 1, wherein the cationic photoinitiator is selected from organic halonium salt, organic iodonium salt, organic sulfonium salt or any combination thereof.

7. The pre-applied adhesive composition according to claim 1, wherein the amount of the (meth)acrylate component is from 5 to 90% by weight based on the total weight of the adhesive composition.

8. The pre-applied adhesive composition according to claim 1, wherein the amount of the non-aromatic epoxy resin is from 20 to 70% by weight based on the total weight of the adhesive composition.

9. The pre-applied adhesive composition according to claim 1, wherein the weight ratio between the (meth)acrylate component and the non-aromatic epoxy resin is from 1:2 to 3:1.

10. The pre-applied adhesive composition according to claim 1, comprising:

(a) from 5 to 90% by weight of at least one (meth)acrylate component;

(b) from 0.1 to 0.5% by weight of at least one accelerator;

(c) from 0.1 to 0.5% by weight of at least one organic peroxide;

(d) from 20 to 70% by weight of at least one non-aromatic epoxy resin; and (e) from 0.5 to 1.5% by weight of at least one cationic photoinitiator; wherein the weight percentages of all components add up to 100% by weight; and the weight ratio between the (meth)acrylate component and the non-aromatic epoxy resin is from 1:4 to 4:1.

11. A production method of the pre-applied adhesive composition according to claim 1 comprising steps of:

a) mixing all components together except for organic peroxide and cationic photoinitiator;

b) adding at least one organic peroxide and at least one cationic photoinitiator to the mixture from step a); and c) further mixing all components uniformly to obtain the pre-applied adhesive composition;

wherein the temperature is controlled to be below 50° C. during the production process.

12. A curing method of the pre-applied adhesive composition according to claim 1 comprising steps of:

a) providing a substrate;

b) applying the pre-applied adhesive composition to a surface of the substrate to generate an adhesive layer;

c) illuminating the adhesive layer with UV light to obtain a dry film;

d) assembling the dry film coated substrate with a mating substrate and creating an anaerobic environment; and e) curing the dry film anaerobically.

13. A dry film formed by the pre-applied adhesive composition according to claim 1.

14. A cured product of the pre-applied adhesive composition according to claim 1.

15. An article coated with or bonded by the dry film of the pre-applied adhesive composition according to claim 13.

16. An article coated with or bonded by the cured product of the pre-applied adhesive composition according to claim 14.

* * * * *